US006532734B1

(12) United States Patent
Nader et al.

(10) Patent No.: US 6,532,734 B1
(45) Date of Patent: Mar. 18, 2003

(54) ON-BOARD DIAGNOSTIC CATALYST MONITORING SYSTEM

(75) Inventors: David Robert Nader, Farmington Hills, MI (US); Michael Igor Kluzner, oak park, MI (US); Michael Daniel Shane, Detroit, MI (US); Michael James Uhrich, Sylvan Lake, MI (US); Robert Joseph Jerger, Dexter, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/062,384

(22) Filed: Feb. 1, 2002

(51) Int. Cl.$^7$ .................................................. F01N 3/00
(52) U.S. Cl. ............................ 60/277; 60/274; 60/276; 60/285
(58) Field of Search .................. 60/274, 276, 277, 60/285; 701/102, 109

(56) References Cited

U.S. PATENT DOCUMENTS

| | | | |
|---|---|---|---|
| 3,969,932 A | | 7/1976 | Rieger et al. |
| 5,289,678 A | | 3/1994 | Grutter |
| 5,544,481 A | | 8/1996 | Davey et al. |
| 5,661,972 A | * | 9/1997 | Katoh et al. ............... 60/276 |
| 5,673,555 A | | 10/1997 | Achleitner |
| 5,801,295 A | | 9/1998 | Davey et al. |
| 5,865,026 A | | 2/1999 | Davey et al. |
| 5,899,062 A | | 5/1999 | Jerger et al. |
| 5,966,930 A | * | 10/1999 | Hatano et al. ............... 60/276 |
| 5,974,786 A | | 11/1999 | Kluzner et al. |
| 6,082,101 A | * | 7/2000 | Manaka et al. ............... 60/285 |
| 6,112,518 A | | 9/2000 | Jerger et al. |
| 6,151,889 A | | 11/2000 | Davey et al. |
| 6,195,986 B1 | | 3/2001 | Davey et al. |
| 6,216,448 B1 | | 4/2001 | Schnaibel et al. |
| 6,216,450 B1 | * | 4/2001 | Takahashi et al. ............ 60/276 |
| 6,289,673 B1 | * | 9/2001 | Tayama et al. ............... 60/285 |
| 6,301,881 B1 | * | 10/2001 | Kumar ........................ 60/274 |

OTHER PUBLICATIONS

N. Kurihara et al.; "An On–Board Diagnosis Method for Three–Way Catalyst Deterioration"; Society of Automotive Engineers, Inc.; 1997; pp. 1–5.

* cited by examiner

Primary Examiner—Thomas Denion
Assistant Examiner—Binh Tran
(74) Attorney, Agent, or Firm—John E. Buckert; Allan J. Lippq

(57) ABSTRACT

A method for determining the effectiveness of a catalyst having both first, relatively high oxidizable material provided to remove emissions from the exhaust of an internal combustion engine and a second, relatively low oxidizable material provided to remove emissions from such exhaust. The method includes measure a difference in oxygen content upstream and downstream of the catalyst while the engine is producing the exhaust to determine the effectiveness of the first material and determining the effectiveness of the second material by comparing time delay in a property of the exhaust as such exhaust passes through the catalyst. In one embodiment, the property of the exhaust is the oxygen content in such exhaust. In one embodiment, the effectiveness of the second material is measured after the first material is determined to be ineffective.

8 Claims, 4 Drawing Sheets

$$\tau = \left[\left(t_3 + \frac{[D_1 - .45] * [t_4 - t_3]}{[D_2 - D_1]}\right) - \left(t_1 + \frac{[U_1 - .45] * [t_2 - t_1]}{[U_2 - U_1]}\right)\right]$$

ON-BOARD DIAGNOSTIC CATALYST MONITORING SYSTEM

BACKGROUND

The present invention relates to a method and system for determining the efficiency of a catalytic converter based on signals generated by pre-catalyst and post-catalyst exhaust gas oxygen sensors.

As is known in the art, increasingly stringent federal regulations limit the permissible levels for emissions. As such, vehicle manufacturers have developed various methods to reduce emissions while improving vehicle performance and fuel economy. Catalytic converters, positioned in the engine exhaust path, are often used to reduce emission levels of regulated exhaust gases. The conversion efficiency of a catalytic converter may be monitored using a pre-catalyst $O_2$ sensor positioned upstream from the catalytic converter and a post-catalyst $O_2$ sensor positioned downstream from the catalytic converter.

One method known for indicating conversion efficiency of the catalyst is to calculate a ratio of downstream sensor transitions or switches to upstream sensor transitions or switches. An increasing switch ratio is generally indicative of a degrading catalyst. When the switch ratio exceeds a threshold value, a malfunction indicator light (MIL) is illuminated so the vehicle operator will seek service. This method of catalyst monitoring is disclosed in Orzel U.S. Pat. No. 5,357,751, assigned to the assignee of the present invention, and is referred to as the Switch Ratio (SR) method. Another method for indicating conversion efficiency of the catalyst is based on the ratio of the arc lengths of the downstream sensor signal to the arc lengths of the upstream sensor signals identified as an Index Ratio (IR) method in contrast to the SR method. This method is disclosed in U.S. Pat. No. 5,899,062, assigned to the assignee of the present invention, and incorporated herein by reference.

The test cycle for catalyst monitoring requires collection of data from each of the sensors while the engine is operating in each of a plurality of inducted airflow ranges or air mass (AM) cells. In each method a predetermined number of transitions or switches of the upstream sensor in each AM cell is required to complete the test cycle. These methods rely on AM cell calibration and assume that sensor signal transitions occurring in a defined AM cell are valid for ratio computation regardless of engine speed and load conditions. The determination of SR and IR based on data taken while the driver is operating the vehicle at a high load, low rpm or low load, high rpm condition results in increased SR and IR variability even though operation is within one of the plurality of inducted airflow ranges. The determination of catalyst conversion efficiency based solely on AM conditions may result in error, and may reduce the ability to discriminate between a good and a failed catalyst.

A method of detecting catalytic converter deterioration based on the ratio of the arc length or the number of transitions of signals from sensors upstream and downstream of the converter where ratio determination is restricted to predefined air mass ranges within corresponding predefined engine speed/load ranges in order to avoid areas of engine speed and load instability that might impair test to test repeatability of the deterioration detection is described in U.S. Pat. No. 6,195,986 assigned to the assignee of the present invention, and incorporated herein by reference.

The inventors have recognized that all presently known methods are designed to monitor total oxygen storage degradation using different upstream to downstream $O_2$ sensor signal calculations. Oxygen storage can be found in two different catalyst wash coat components: Ceria (cerium oxides) and precious metal. Total oxygen storage availability is a function of the Ceria and precious metal content in wash coat and as well their dispersions and mutual locations (within the wash coat). The high $O_2$ storage (Ceria) catalyst has been the standard for monitoring starting in circa 1994 model years. Ceria is the weaker link in the wash coat when compared to the precious metal (PM). Ceria degrades sooner than does the PM when exposed to thermal or chemical (phosphorus) degradation. The current production\Index Ratio (IR) catalyst monitor measures the change in the $O_2$ sensor signal amplitude, as the catalyst ages. The rear $O_2$ sensor signal increases in activity as the catalyst loses ability to store oxygen. The Index monitor measures the catalyst $O_2$ storage (ceria) only and infers the emissions. The ratio of the rear $O_2$ sensor is compared to the front $O_2$ sensor, as the ratio approaches 1.0 the catalyst failed.

During the catalyst monitor calibration process, the emission and catalyst index relationship are established testing differently aged catalyst. The index vs. Tail Pipe FTP emission function typically referred as a "hockey stick curve". Monitoring the index in the field allows the catalyst "health" or tailpipe emission from catalyst index. (FIG. 1) to be inferred. For the FIG. 1 hockey stick curve, the "slope" is attributed to the loss of $O_2$ storage that is measured as an increase in the amplitude of the rear, or CMS $O_2$ sensor signal compared to the amplitude of front $O_2$ sensor signal. At the knee of the curve, basically all of cerium oxides (oxygen storage) are gone. After the knee the emissions are still increasing but the Index ratio is constant. This flat portion of the "hockey stick curve" is insensitive to the existing catalyst monitor. The real world failure illustrated in FIG. 1 demonstrates a catalyst that has lost it's ability to storage oxygen (high Index ratio) yet has good emissions. The cerium oxides based oxygen storage is gone (very susceptible phosphorus contamination) while the precious metal based oxygen storage still stay untracked. This catalyst was phosphorous poisoned in the field and turned on the malfunction indicator light (MIL). The concern is that while the catalyst has lost it's ability to storage oxygen it may still be a very good emission catalyst. No longer is catalyst monitoring limited to a single measurement of $O_2$ storage. At the knee of the "hockey stick curve" the A/F signal amplitude entering and exiting the catalyst is almost the same. From this time on, the catalyst has no Ceria based $O_2$ storage. The precious metal(s) (PM) alone continues to degrade but still carry some $O_2$ storage due to affinity of oxygen and PM. The PM crystals grow larger (degrade) due to thermal aging thus reducing the active surface area and increase the emissions. The exhaust gas residency time or presence next to the active PM sites with some oxygen storage is the detectable (measured) metric, here time delay, $\tau$ (tau) or phase shift through the catalyst. On the flat portion of the hockey stick curve $\tau$ (tau) is still changing. $\tau$ (tau) is the transport delay (time) between the front and rear $O_2$ signals which measures the change of catalyst activity. As the (no Ce $O_2$ storage) catalyst degrades the value of $\tau$ (tau) decreases (FIG. 2). The measurable $O_2$ sensor signal change for a catalyst as it ages to low or no cerium oxides based oxygen storage is the time constant tau. Tau is the time, or transport, delay between the upstream and downstream ) $O_2$ sensor signals. Tau or time delay varies at different rpm, loads, air mass and monitor volume for a given aged catalyst. However, $\tau$ decreases over time as the catalyst ages.

To put it another way, the inventors have recognized that the are two different types of material in the converter: one highly oxidizable (e.g., Ceria); and the other relatively less oxidizable. Thus, while increases in the amplitude of the oxygen sensed by the downstream converter indicates deterioration in the oxidizable material, and therefore its loss of effectiveness, there may still be effectiveness in the less oxidizable material performing the requisite emission reductions. Applicants further recognized that the effectiveness of the less oxidizable material may be measured by measuring the time delay, or phase shift, between the signals produced by the upstream and downstream sensors. Thus, the applicants have determined that the effectiveness of each of the oxidizable and relatively non-oxidizable materials in the catalytic converter (i.e., the materials making up the catalyst) can be separately evaluated (i.e., measured independently); the former by the relative amplitudes between the oxygen before and after the catalyst; and, the latter by some other measurable parameter, such as time delay through the catalyst.

SUMMARY

In accordance with the present invention a method is provided for determining the effectiveness of a catalyst having both first, relatively high oxidizable material provided to remove emissions from the exhaust of an internal combustion engine and a second, relatively low oxidizable material provided to remove emissions from such exhaust. The method includes measure a difference in oxygen content upstream and downstream of the catalyst while the engine is producing the exhaust to determine the effectiveness of the first material and determining the effectiveness of the second material by comparing time delay in a property of the exhaust as such exhaust passes through the catalyst.

In one embodiment, the property of the exhaust is the oxygen content in such exhaust.

In one embodiment, the effectiveness of the second material is measured after the first material is determined to be ineffective.

In accordance with the present invention, a method is provided for monitoring efficiency of a catalytic converter during operation of an internal combustion engine coupled to the catalytic converter as exhaust from the engine passes through such converter. The method includes measuring an upstream time history of oxygen content of the exhaust upstream of the converter and a downstream time history of oxygen content of the exhaust downstream of the converter. The difference in such measured amplitudes is determined. A determination is made when the determined difference is less than a predetermined value indicating potential ineffectiveness of the converter. A time, or transport delay is determined between the upstream time history and the downstream time history. The determined time delay is compared with a reference time delay to determine the efficiency of the converter. The converter is determined to be ineffective if the converter as been determined to be potentially ineffective and the time delay is determined to be less than the reference time delay.

In one embodiment the converter includes an oxidizable material and a precious metal material.

A determination is made when the measured upstream first property and the measured downstream first property differ by a first predetermined value indicating potential ineffectiveness of the converter. An upstream time history of a second property of the exhaust upstream of the converter and a downstream time history of the second property of the exhaust downstream of the converter is measured. A determination is made when the measured upstream second property and the measured downstream second property differ by a second predetermined value. A determination is made when the measured upstream second and the measured downstream second property differ by a second predetermined value. A determination is made that the catalyst is ineffective if the catalyst has been determined to be potentially ineffective and the measured upstream second and the measured downstream second property differ by the second predetermined value.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6A showing the time history of the upstream sensor; FIG. 6B showing the time history of the downstream sensor for a good catalytic converter and FIG. 6C showing the time history of the downstream sensor for a good catalytic converter.

Like reference symbols in the various drawings indicate like elements.

DETAILED DESCRIPTION

Figure 1:
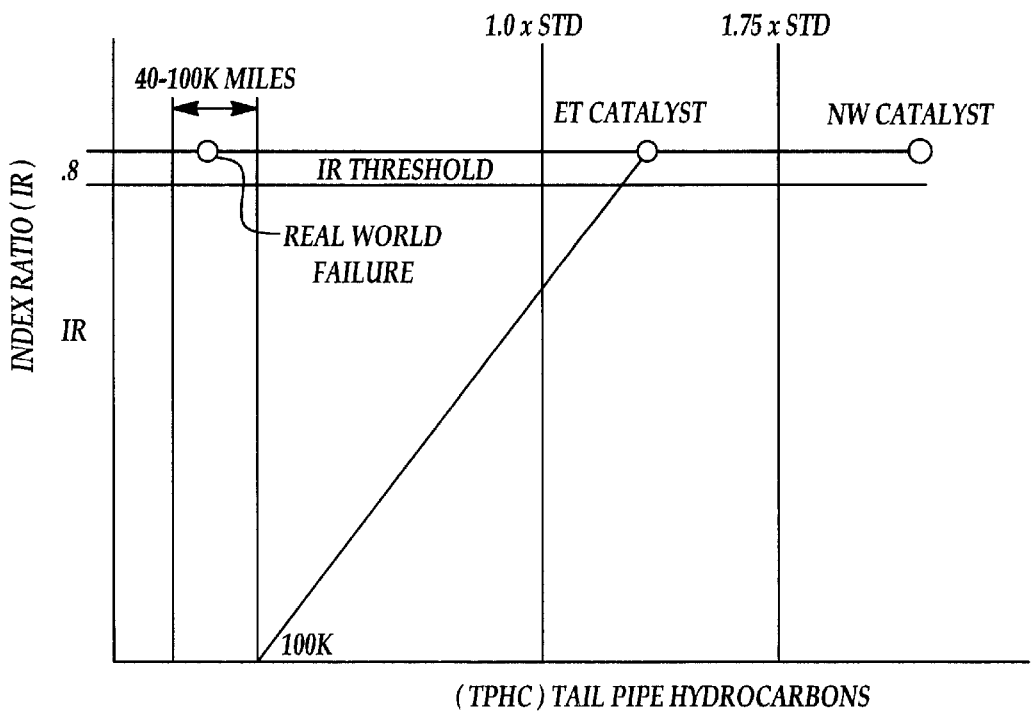
FIG. 1 is a curve showing the relationship between emissions downstream of a catalytic converter and a ratio related to oxygen in the exhaust measured upstream of the converter to oxygen content measured downstream of the converter.
Figure 2:
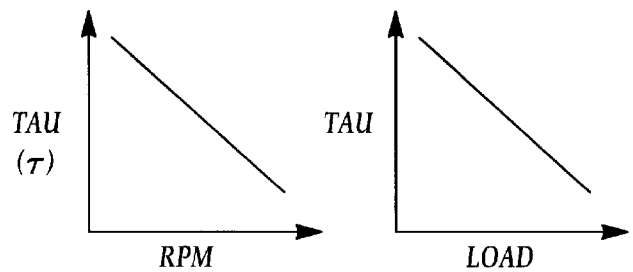
FIG. 2 shows relationship between an upstream time history of a property, here time, or transport delay, or time delay $\tau$ between an upstream time history and the downstream time history of a property, here oxygen content, of the exhaust as a function of engine rpm, engine load and catalyst efficiency.
Figure 2:
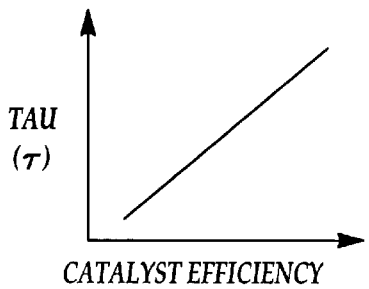
Figure 3:
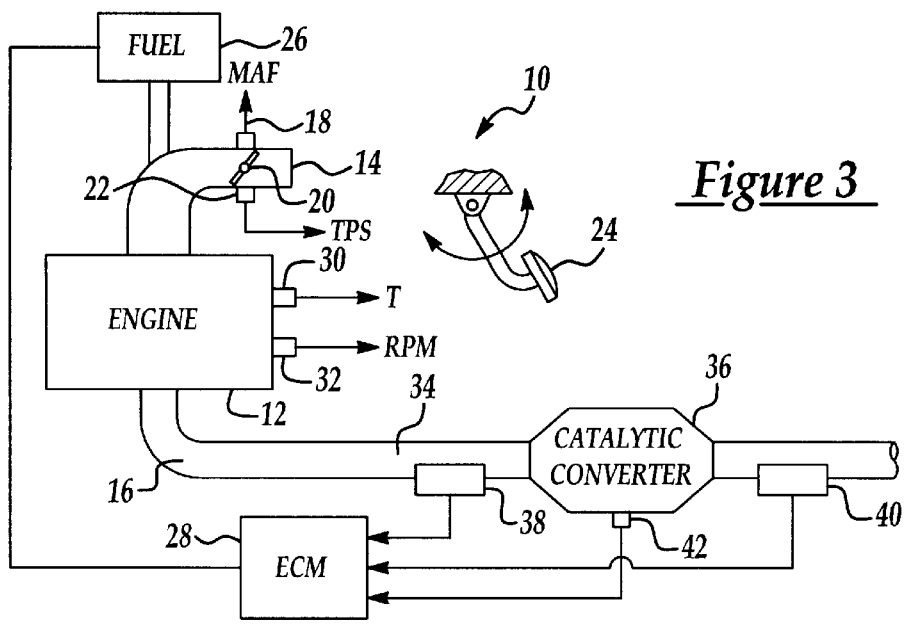
FIG. 3 is a block diagram of a system for monitoring catalytic converter effectiveness according to the invention.

Referring now to FIG. 3, a block diagram illustrating a system for monitoring performance or conversion efficiency of a catalytic converter is shown. System 10 includes an internal combustion engine 12 having an intake manifold 14 and exhaust manifold 16. Airflow through intake manifold 14 is measured by mass air flow (MAF) sensor 18 and regulated by throttle valve 20. A throttle position sensor 22 provides a signal (TPS) indicative of position of throttle valve 20 or an associated accelerator pedal 24. A conventional fuel supply 26 provides fuel which is mixed with the air in intake manifold 14 to provide a combustion mixture which is controlled by an engine controller, such as Engine Control Module (ECM) 28. An engine coolant temperature sensor 30, and an engine speed (RPM) sensor 32 communicates engine temperature and engine speed information respectively to the ECM 28. ECM 28 may also perform control and monitoring functions for various vehicle systems and subsystems in addition to controlling and monitoring engine 12.

An exhaust pipe 34 couples a catalytic converter 36, preferably a three-way converter (TWC) to the exhaust stream of engine 12. Catalytic converter 36 is monitored via an upstream (front) exhaust gas sensor 38 and a downstream (rear) exhaust gas sensor 40 each in communication with the engine controller 28. Upstream sensor 38 is located between engine 12 and catalytic converter 36 whereas downstream sensor 40 is located between catalytic converter 36 and the atmosphere. Upstream sensor 38 is preferably an exhaust gas oxygen sensor, commonly referred to as a HEGO sensor, which provides an indication of presence or absence of oxygen in the exhaust stream. Downstream sensor 40 operates in a similar fashion as upstream sensor 38 but is commonly referred to as a catalyst monitor sensor (CMS) due to its intended function in the exhaust system. Any of a number of exhaust gas sensors may be utilized including lambda sensors, proportional oxygen sensors, and the like, to determine conversion efficiency of the converter according to the present invention. A catalytic converter temperature sensor 42 provides data to the ECM 28 regarding converter temperature. Alternatively, the converter temperature may be inferred, from other sensor data in order to avoid the cost of an additional dedicated temperature sensor. Various other sensors communicate with ECM 28 to facilitate control and monitoring functions. These sensors may include an EGR sensor or other device for exhaust gas recirculation monitoring.

The ECM 28 includes a microprocessor and various computer readable storage media, which may include but is not limited to a read only memory (ROM), a random access memory (RAM), and a keep-alive memory (KAM). The computer readable storage media may be implemented by any of a number of known volatile and nonvolatile storage devices including but not limited to PROM, EPROM, EEPROM, flash memory, and the like, all of which are well known in the art. RAM is typically used for temporary data storage of various operating variables which are lost when the engine ignition is turned off, such as counters, timers, status flags, and the like. KAM is generally used to store learned or adaptive values which may change over time. The contents of KAM are maintained as long as some power is provided to ECM 28. Preferably, one or more ROMs within ECM 28 contains control logic implemented by program instructions executed by the microprocessor along with various system parameter values and calibrations.

The ECM 28 receives signals from upstream and downstream exhaust gas sensors 38 and 40, respectively, which reflect current operating conditions of engine 12 and converter 36. For example, when at or above operating temperature, upstream sensor 38 provides a continuous signal (preferably a voltage) to ECM 28 based on the presence or absence of oxygen in exhaust pipe 34. The voltage signal is indicative of the excursion from the stoichiometric combustion mixture of the exhaust gases in exhaust manifold 16. The upstream sensor signal is a two-state signal having a predetermined high voltage when exhaust gases indicate a rich mixture and a predetermined low voltage when exhaust gases indicate a lean mixture. Downstream sensor 40 monitors catalytic converter 36 by detecting the presence or absence of oxygen downstream from converter 36 and provides a voltage signal to ECM 28.

The ECM 28 uses control logic implemented in hardware and/or software to generate various signals to control and monitor operation of engine 12. For example, controller 28 generates an output signal to electronic fuel injectors, represented by fuel supply 24, to control the quantity and timing of fuel delivered to engine 12 in response to a feedback variable derived from an output of the upstream sensor 38.

In the present invention, the ECM 28 is also used to monitor performance of catalytic converter 36 using the signals from upstream sensor 38 and downstream sensor 40. The sensor signals are filtered, periodically sampled, and stored within ECM 28 to monitor performance of catalytic converter 36. The amplitude variation or excursion of the signal of the downstream sensor 40 is much less than that of the signal from the upstream sensor 38 due to the operation of the catalytic converter in converting the exhaust gases. As such, catalyst monitors that rely on amplitude variation of the downstream sensor signal are less sensitive to variations induced by catalyst degradation. In contrast, the index ratio metric is based on the arc-length of the signal and the incorporation of a time-based or horizontal component of the sensor signal produces superior sensitivity as explained in the aforementioned U.S. Pat. No. 6,195,986.

Figure 4A:
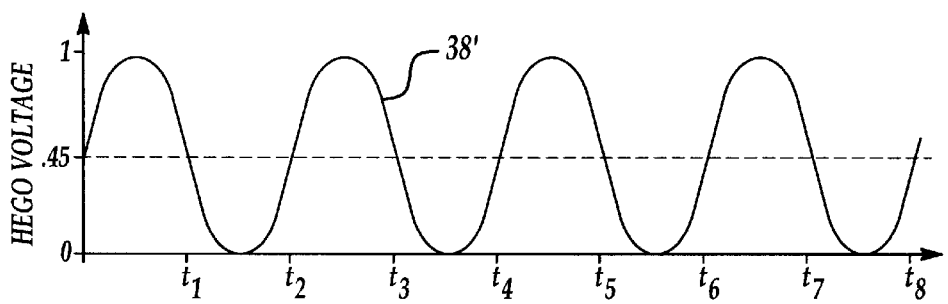
FIGS. 4A is a graph of a signal produced by an upstream exhaust gas sensor as a function of time.
Figure 4B:
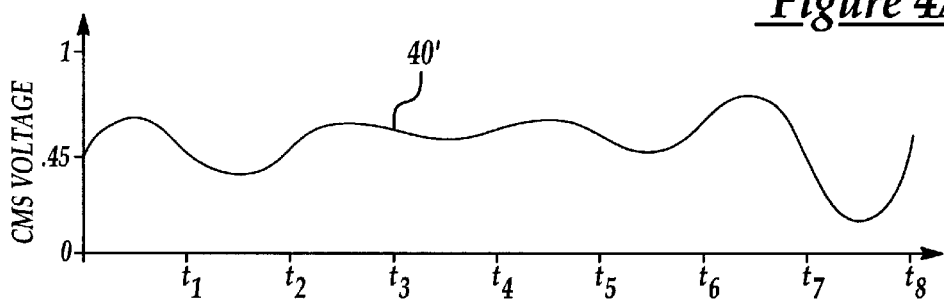
FIG. 4B is a graph of a signal produced by a downstream exhaust gas sensor for a catalytic converter having a high exhaust gas conversion efficiency.
Figure 4C:
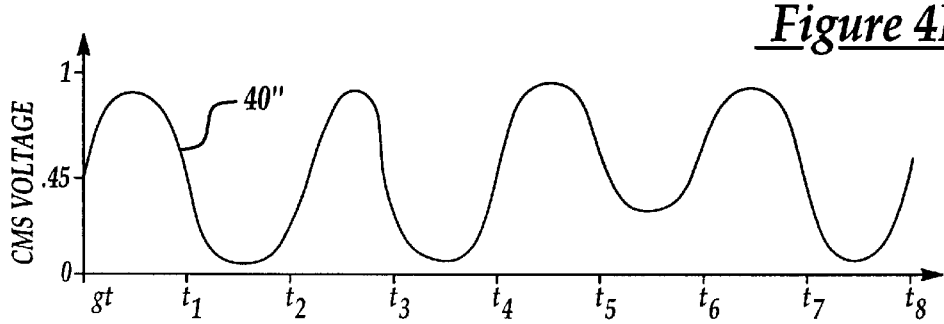
FIG. 4C as graph of a signal produced by a downstream exhaust gas sensor for a catalytic converter more aged than the converter producing the signal shown in FIG. 4B.

Referring now to FIGS. 4A–4C, representative voltage signals generated by sensors 38 and 40 are shown. FIG. 4A illustrates an upstream voltage signal 38' from HEGO sensor 38 as a function of time. The voltage 38' from upstream sensor 38 oscillates through a switch point of 0.45 volts between a high voltage and a low voltage in response to the combustion mixture oscillating about the stoichiometric ratio during closed loop control.

FIG. 4B shows a representative voltage 40' from downstream sensor 40 as a function of time for a catalyst having a relatively high conversion efficiency. Although the frequency of downstream signal 40' is the same as the frequency of upstream signal 38', downstream signal 40' has a much different variation in amplitude than upstream signal 38' and is time delayed due to the propagation delay of exhaust gases passing through the converter 36. The amplitude variation or excursion of downstream signal 40' is much less than that of upstream signal 38' to the operation of the catalytic converter in converting the exhaust gases. As such described in the above referenced U.S. Pat. No. 5,899,062, the arc length measuring and ratio method described therein incorporates the time-based or horizontal component of the sensor signal into the catalyst efficiency indicator.

FIG. 4C illustrates a representative downstream voltage signal 40" provided by CMS sensor 40 as a function of time. In this case, the amplitude variation of downstream signal 40" is much greater than the variation of downstream signal 40' because the Cerium oxides in the catalyst 36 has be highly oxidized and no longer "absorbs" (i.e., reacts with) oxygen in the exhaust fed to the catalyst. Thus, the arc length ratio described in U.S. Pat. No. 5,899,062 is nearly unity. Detection of this nearly unity arc length ratio while indicating that the Cerium oxides are no longer effective in reducing emissions, does not provide any indication as to whether the precious metals in the catalyst 36 are effective in reducing emissions to within governmental regulations.

Applicants have recognized that detection of the time delay through the catalyst of the signals produced by the upstream and downstream sensors 38 and 40 provides a measure of the effectiveness of the precious metals reduction of emissions.

More particularly, referring to FIGS. 4A–4C as noted above FIG. 4B shows the voltage produced by the downstream sensor 40 after the Ceruim has lost its effectiveness. Under such condition, there is a reduction in the time delay between the signals produced by the upstream and downstream sensors. Applicants have measured the time delay between such upstream and downstream signal using a new, or green catalyst "poisoned" by phosphorous to remove any emission removal effectiveness of the Cerium oxides. Applicants have determined that this green, or new catalyst is still able to reduce emissions to acceptable levels because of the precious metals in the catalyst. They first measure the time delay of the green but poisoned catalyst, here $\tau_0$. After many additional hours of use, this now aged catalyst has its emission reduction effectiveness measured along with the time delay between the upstream and downstream sensor 38, 40 output signal. The process continued until the catalyst is no longer effective, i.e., the precious metals have lost their effectiveness in removing emissions such that the catalyst no longer met governmental requirement. At this time, the time delay $\tau_1$, between the upstream and downstream sensors 38, 40 is measured. This measured time delay $\tau_1$ becomes a measure of a minimum time delay threshold such that if the actual time delay of a catalyst falls below this level $\tau_1$, the catalyst is deemed to be ineffective and the MIL is activated.

The time delay may be determined a number of different ways. Here, the arc length ratio method described in the above referenced U.S. Pat. No. 5,899,062 is used to measure the effectiveness of the catalyst. Thus, the voltages of the sensors shown in FIGS. 4A and 4B are sampled at regularly known sample times. After the arc length ratio indicates that there is substantially little change in the relationship between the amplitude time history of the upstream sensor 38 output voltage and the downstream sensor 40 output voltage (i.e., the Ceria is no longer effective), the ECM 28 computes, from samples which are continued to be taken, the time delay $\tau$. It is noted that the measurements are performed during a known rpm/load condition, here for example, an idle condition.

Figure 5:
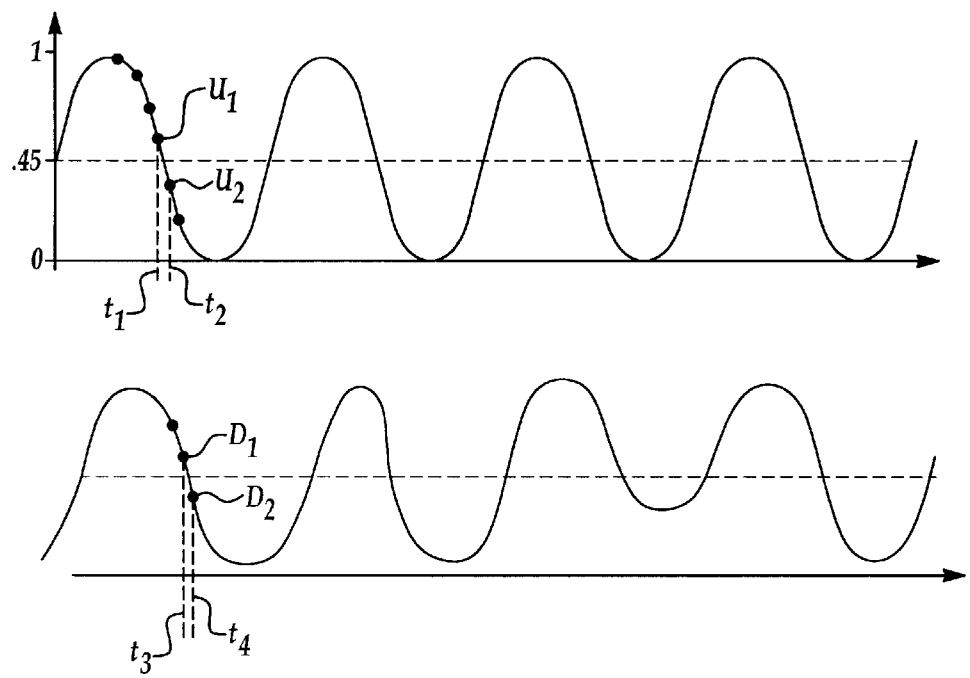
FIG. 5 are curves, the upper curve showing the time history of the upstream exhaust gas oxygen sensor of the a catalytic converter and the lower curve showing the time history of the downstream exhaust gas oxygen sensor of the same catalytic converter, such curves being shown with the same time reference.

Thus, referring to FIG. 5, the upper curve shows the time history of the output of the upstream sensor 38 while the lower curve shows, on the same time base, the time history of the downstream sensor 40. Here samples are shown by the dots in the FIG. 5. The ECM 28 detects when the voltage goes through a set point level, here for example 0.45 volts. The ECM 28 stores the voltages before and after passing through the set point level and records the times associated with such voltage levels. (Reference is made to U.S. Pat. No. 5,544,481 Davey et al, assigned to the same assignee as the present invention, the entire subject matter thereof being incorporated herein by reference). Thus, here the upstream voltages passes through the 0.45 set point level between times $t_1$, and $t_2$. The voltage of upstream sensor 38 at time $t_1$, here $U_1$, is stored in the ECM and the voltage $U_2$ of the upstream sensor 38 at time $t_2$ is stored in the ECM. The output of the downstream sensor 40 is also monitored. When the voltage of the downstream sensor 40 falls below the same set point here 0.45 volts after the upstream sensor 38 fell through such set point, here between the times $t_3$ and $t_4$, the voltages at times $t_3$ and $t_4$, here $D_1$ and $D_2$, respectively, are stored in the ECM. A computation of $\tau t$ is made in the ECM in accordance with:

$$\tau = \left\{ \left( t_3 + \frac{|D_1 - 4.5|}{|D_2 - D_1|} * |t_4 - t_3| \right) - \left( \left( t_1 + \frac{|U_1 - 4.5|}{|U_2 - U_1|} * |t_2 - t_1| \right) \right) \right\}$$

The ECM determines when the computed $\tau$ is less than the minimum time delay threshold described above and if the actual time delay of a catalyst falls below this level $\tau_1$, the MIL is activated.

Figure 6A:
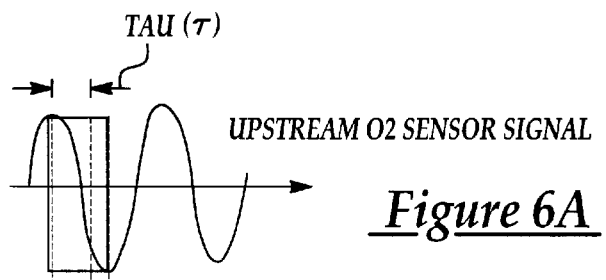
FIGS. 6A–6C are curves useful in understanding a method for determining time delay between the upstream exhaust oxygen sensor and an exhaust gas oxygen sensor downstream of a catalyst being monitored.
Figure 6B:
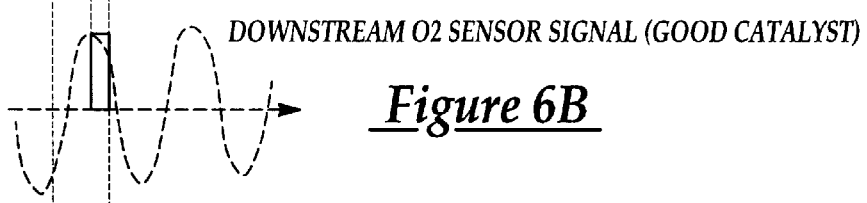
Figure 6C:
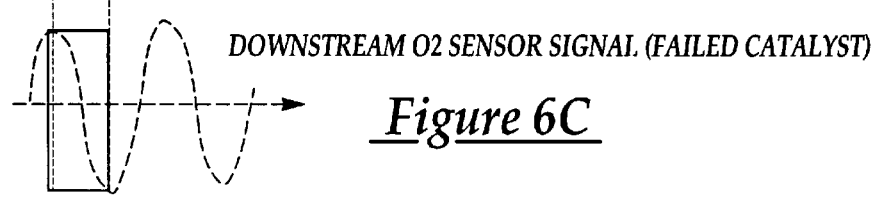

Another method for determining time delay between the upstream and downstream sensor signals using the arc length data obtained and used for evaluating the effectiveness of the ceria will be described in connection with FIGS. 6A–6C. Thus, here the arc length of the upstream sensor signal is measured as such signal passes between a maximum, here at time $t_a$ and a minimum, here at time $t_b$. The arc length of the signal from the downstream sensor is measured beginning at a time $t_c$ such downstream signal reaches a maximum until the upstream signal indicates that it ha reached its minimum here at time $t_b$. The time delay t is $t_b-t_c$.

Figure 7:
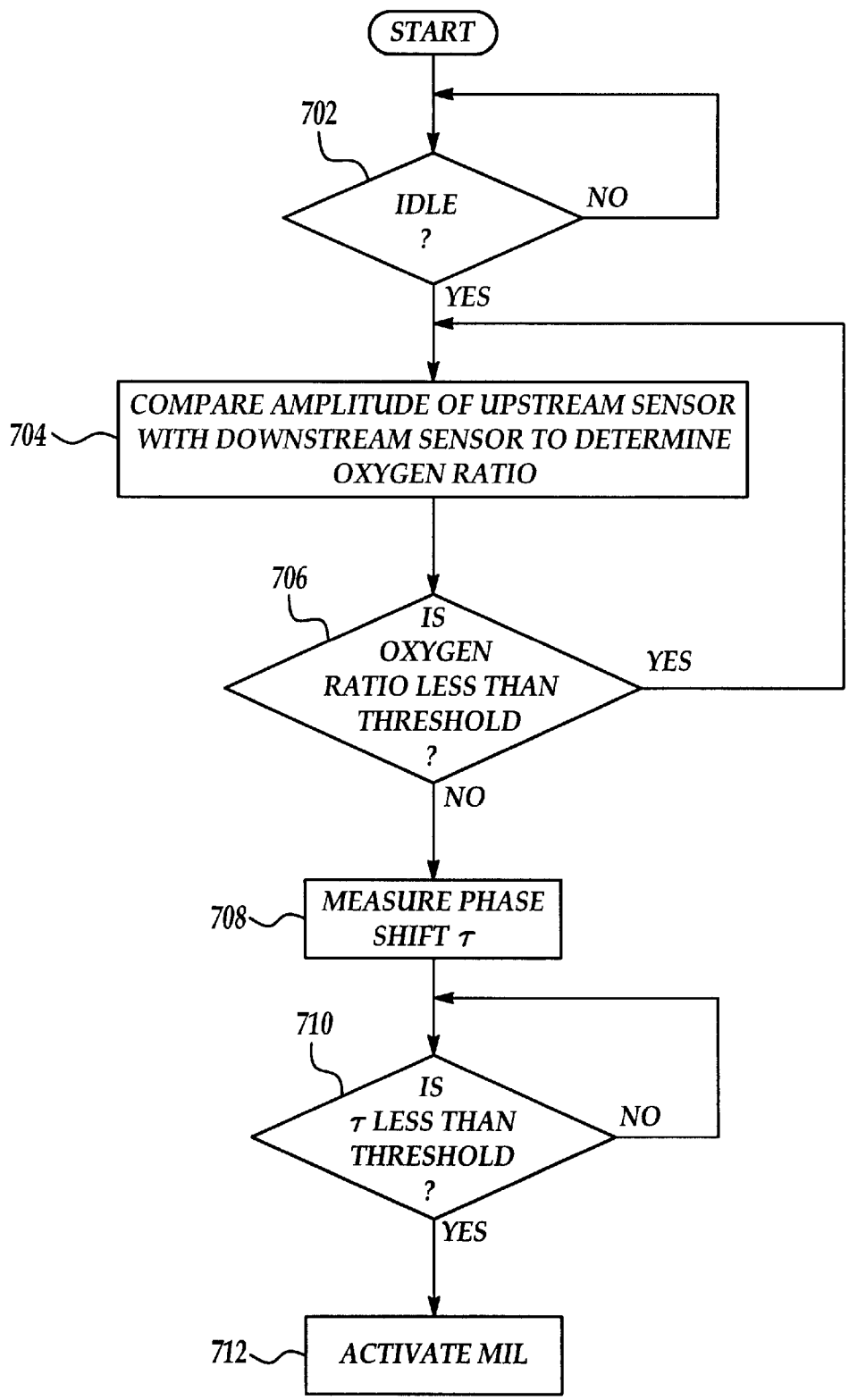
FIG. 7 is a flow diagram of the method for evaluating the effectiveness of a catalytic converter according to the invention.

Referring now to FIG. 7 the method described above is summarized in the flow diagram shown, Thus, when the engine is at some predetermined operating condition, here idle the test is performed (Step 702). First a comparison is made between the signals produced by the upstream and downstream oxygen exhaust sensors and the ECM processes such signal to determine the oxygen ratio of the oxygen in the downstream of the converter to the oxygen in the exhaust upstream of the converter. If the ratio is less than a predetermined threshold (Step 796), the converter is effective and the process continues to make such comparison (returns to Step 704). If, on the other hand the ratio is less than the threshold, the time delay between the upstream and downstream oxygen exhaust sensors is measured (Step 708). If the measured time delay is greater than a predetermined threshold, the time delay measurement continues. On the other hand if the time delay is less than such predetermined threshold, the catalytic converter is deemed ineffective and the MIL is activated.

A number of embodiments of the invention have been described. Nevertheless, it will be understood that various modifications may be made without departing from the spirit and scope of the invention. Accordingly, other embodiments are within the scope of the following claims.

What is claimed is:

1. A method for determining the effectiveness of a catalyst having both first, relatively high oxidizable material provided to remove emissions from the exhaust of an internal combustion engine and a second, relatively low oxidizable material provided to remove emissions from such exhaust, such method comprising:
   measuring a difference in oxygen content upstream and downstream of the catalyst while the engine is producing the exhaust to determine the effectiveness of the first material; and
   determining the effectiveness of the second material by comparing time delay in a property of the exhaust as such exhaust passes through the catalyst.

2. The method recited in claim 1 wherein the property of the exhaust is oxygen content.

3. The method recited in claim 2 wherein the effectiveness of the second material is measured after the first material is determined to be ineffective.

4. A method for monitoring efficiency of a catalytic converter during operation of an internal combustion engine coupled to the catalytic converter as exhaust from the engine passes through such converter, such method comprising:

measuring an upstream time history of oxygen content of the exhaust upstream of the converter and a downstream time history of oxygen content of the exhaust downstream of the converter;

determining a difference in such measured amplitudes;

determining when the determined difference is less than a predetermined value indicating potential ineffectiveness of the converter;

measuring a time delay between the upstream time history and the downstream time history; and comparing the determined time delay with a reference time delay to determine the efficiency of the converter, such converter being determined to be ineffective if the converter has been determined to be potentially ineffective and the time delay is less than the reference time delay.

5. The method recited in claim 4 wherein the predetermined value is between two operating stoichiometric ratios.

6. The method recited in claim 5 wherein the converter includes an oxidizable material and a precious metal material.

7. A method for monitoring efficiency of a catalytic converter having a relatively highly oxidizable material to react with products in the exhaust and a relatively less oxidizable material to react with products in the exhaust as exhaust from the engine passes through such converter, such method comprising:

measuring an upstream time history of a first property of the exhaust upstream of the converter and a downstream time history of the first property of the exhaust downstream of the converter;

determining when the measured upstream first property and the measured downstream first property differ by a first predetermined value indicating potential ineffectiveness of the converter;

measuring an upstream time history of a second property of the exhaust upstream of the converter and a downstream time history of the second property of the exhaust downstream of the converter;

determining when the measured upstream second property and the measured downstream second property differ by a second predetermined value;

determining when the measured upstream second and the measured downstream second property differ by a second predetermined value;

determining the ineffectiveness if the catalyst has been determined to be potentially ineffective and the measured upstream second and the measured downstream second property differ by the second predetermined value.

8. A method for determining degradation of a catalyst communicating with exhaust gases from said engine, said catalyst having first and second oxidizable materials removing emissions from said exhaust gases, said method including:

measuring a difference in oxygen content upstream and downstream of said catalyst while said engine is producing said exhaust gases to determine when said first oxidizable material is degraded;

measuring a time delay in a property of said exhaust gases as said gases pass through said catalyst to determine when said second oxidizable material is degraded; and, indicating said catalyst is degraded when said first and second oxidizable materials are degraded.

* * * * *